United States Patent
Wang

(10) Patent No.: US 10,348,882 B2
(45) Date of Patent: Jul. 9, 2019

(54) INTERFACE DISPLAY METHOD, COMMUNICATION TERMINAL AND COMPUTER STORAGE MEDIUM

(71) Applicant: NUBIA TECHNOLOGY CO., LTD., Shenzhen (CN)

(72) Inventor: Haiqing Wang, Shenzhen (CN)

(73) Assignee: NUBIA TECHNOLOGY CO., LTD., Shenzhen (CN)

( * ) Notice: Subject to any disclaimer, the term of this patent is extended or adjusted under 35 U.S.C. 154(b) by 3 days.

(21) Appl. No.: 15/506,806

(22) PCT Filed: Sep. 7, 2015

(86) PCT No.: PCT/CN2015/089079
§ 371 (c)(1),
(2) Date: Apr. 26, 2017

(87) PCT Pub. No.: WO2016/034152
PCT Pub. Date: Mar. 10, 2016

(65) Prior Publication Data
US 2017/0244826 A1  Aug. 24, 2017

(30) Foreign Application Priority Data
Sep. 5, 2014 (CN) .......................... 2014 1 0452279

(51) Int. Cl.
*H04M 3/00* (2006.01)
*H04M 1/725* (2006.01)
*H04W 88/06* (2009.01)

(52) U.S. Cl.
CPC ... *H04M 1/72563* (2013.01); *H04M 1/72519* (2013.01); *H04W 88/06* (2013.01); *H04M 2250/14* (2013.01)

(58) Field of Classification Search
None
See application file for complete search history.

(56) References Cited

U.S. PATENT DOCUMENTS

| | | | |
|---|---|---|---|
| 2009/0088211 A1* | 4/2009 | Kim | H04M 1/72519 455/558 |
| 2011/0287807 A1* | 11/2011 | Jung | H04B 1/0064 455/557 |
| 2013/0225239 A1* | 8/2013 | Wu | H04M 1/72519 455/558 |

FOREIGN PATENT DOCUMENTS

| | | |
|---|---|---|
| CN | 101400179 A | 4/2009 |
| CN | 103298161 A | 9/2013 |
| CN | 103298163 A | 9/2013 |
| CN | 103731544 A | 4/2014 |
| CN | 104243700 A | 12/2014 |

OTHER PUBLICATIONS

Machine translation_Liu-Interface Management Method and Device for Multi-Card Terminal-CN103298163A-09-11-2013.pdf.*

(Continued)

*Primary Examiner* — Jinsong Hu
*Assistant Examiner* — Alexander J Yi
(74) *Attorney, Agent, or Firm* — Anova Law Group, PLLC

(57) ABSTRACT

An interface display method, a communication terminal and a computer storage medium. The interface display method comprises: detecting the number of SIM card(s) in a terminal; and according to the number of the SIM card(s), determining a display interface of the terminal.

6 Claims, 6 Drawing Sheets

(56) References Cited

OTHER PUBLICATIONS

The World Intellectual Property Organization (WIPO) International Search Report and Written Opinion for PCT/CN2015/089079 dated Oct. 13, 2015 9 Pages.

* cited by examiner

US 10,348,882 B2

INTERFACE DISPLAY METHOD, COMMUNICATION TERMINAL AND COMPUTER STORAGE MEDIUM

TECHNICAL FIELD

The present disclosure relates to a communication technology, and particularly to an interface display method, a communication terminal and a computer storage medium.

BACKGROUND

Emergence of a dual-card terminal provides convenience for a user having a dual-card demand. The user may insert two Subscriber Identity Module (SIM) cards, usually a personal phone card and an office phone card, into a terminal simultaneously. Thus, only one terminal instead of two terminals is required for communication with the outside by using two cards.

Regardless of a single card or dual cards inserted currently into an existing dual-card terminal, a dual-card interface is always displayed. The dual-card interface is apparently necessary to a dual-card user. However, the dual-card interface is unnecessary to a single-card user or a user who does not use dual cards for a long time, and much inconvenience is brought to use of a user. Thus, the single-card user will intentionally avoid the dual-card terminal during the terminal selection, thereby being disadvantageous in popularization and use of the dual-card terminal.

SUMMARY

The embodiments of the present disclosure provide an interface display method and a communication terminal, which are intended to dynamically adjust a display interface of a dual-card terminal according to a usage condition or usage habit of a user and to provide convenience in use for a user who uses a single card for a long time.

The embodiments of the present disclosure provide an interface display method, including:

detecting a number of Subscriber Identity Module (SIM) card(s) in a terminal; and determining a display interface of the terminal according to the number of the SIM card(s).

In one embodiment, determining the display interface of the terminal according to the number of the SIM card(s) includes:

determining the display interface of the terminal to be a dual-card interface, when there are dual cards; and determining the display interface of the terminal to be a single-card interface, when there is a single card.

In one embodiment, determining the display interface of the terminal according to the number of the SIM card(s) includes:

determining the display interface of the terminal to be a dual-card interface, when there are dual cards;

further judging whether dual cards have been inserted into the terminal before, when there is a single card; and determining the display interface of the terminal to be a dual-card interface, when dual cards have been inserted before, and determining the display interface of the terminal to be a single-card interface, when dual cards have never been inserted before.

In one embodiment, determining the display interface of the terminal according to the number of the SIM card(s) includes:

determining the display interface of the terminal to be a dual-card interface, when there are dual cards;

further judging whether dual cards have been inserted into the terminal before, when there is a single card; and inquiring a user about which display interface to be selected and then determining the display interface of the terminal according to of the user's selection, when dual cards have been inserted before; and determining the display interface of the terminal to be a single-card interface, when dual cards have never been inserted before.

In one embodiment, further judging whether dual cards have been inserted into the terminal before includes:

reading a system attribute value of the terminal; and determining that dual cards have been inserted into the terminal before, when the system attribute value is marked as a dual-card interface; and determining that dual cards have not been inserted into the terminal before, when the system attribute value is not marked as a dual-card interface.

The embodiments of the present disclosure provide a communication terminal including a detection module and an interface display module, wherein the detection module is configured to detect a number of SIM card(s) in the terminal; and the interface display module is configured to determine a display interface according to the number of the SIM card(s).

In one embodiment, the interface display module is configured to:

determine the display interface to be a dual-card interface, when the SIM cards in the terminal are dual cards; and determine the display interface to be a single-card interface, when the SIM card in the terminal is a single card.

In one embodiment, the interface display module is configured to:

determine the display interface to be a dual-card interface, when the SIM cards in the terminal are dual cards;

judge whether dual cards have been inserted into the terminal before, when the SIM card in the terminal is a single card; and determine the display interface to be a dual-card interface, when dual cards have been inserted before; and determine the display interface to be a single-card interface, when dual cards have never been inserted before.

In one embodiment, the interface display module is configured to:

determine the display interface to be a dual-card interface, when the SIM cards in the terminal are dual cards;

judge whether dual cards have been inserted into the terminal before, when the SIM card in the terminal is a single card; and inquire a user about which display interface to be selected and then determine the display interface according to of the user's selection, when dual cards have been inserted before; and determine the display interface to be a single-card interface, when dual cards have never been inserted before.

In one embodiment, the interface display module is configured to:

read a system attribute value of the terminal; and determine that dual cards have been inserted into the terminal before, when the system attribute value is marked as a dual-card interface; and determine that dual cards have not been inserted into the terminal before, when the system attribute value is not marked as a dual-card interface.

The embodiments of the present disclosure further provide a computer storage medium having stored therein executable instructions for executing the above-mentioned interface display method.

In the embodiments of the present disclosure, a number of SIM card(s) is detected and a single-card interface or a dual-card interface is dynamically displayed according to the number of the SIM card(s). Therefore, a display interface is dynamically adjusted according to a usage condition or usage habit of a user, and the single-card interface is displayed only for a single-card user, thereby providing convenience in use for the user who uses a single card for a long time, while simplifying an operation flow when a dual-card user inserts a single card, and facilitating the popularization and use of a dual-card terminal.

Moreover, the single-card interface or the dual-card interface is dynamically displayed by combining the number of current SIM card(s) and the situation of the previously-inserted SIM cards. Even if a situation of transient card drop occurs when the user inserts dual cards, the dual-card interface will be displayed during the period of card drop, so the single-card interface can be always displayed for the single-card user, and the dual-card interface can be always displayed for the dual-card user. In addition, when it is detected that the dual-card user uses a single card currently, the user may select a display interface. Due to provision of an independent choice right for the user, the user experience is improved.

DETAILED DESCRIPTION

Figure 1:
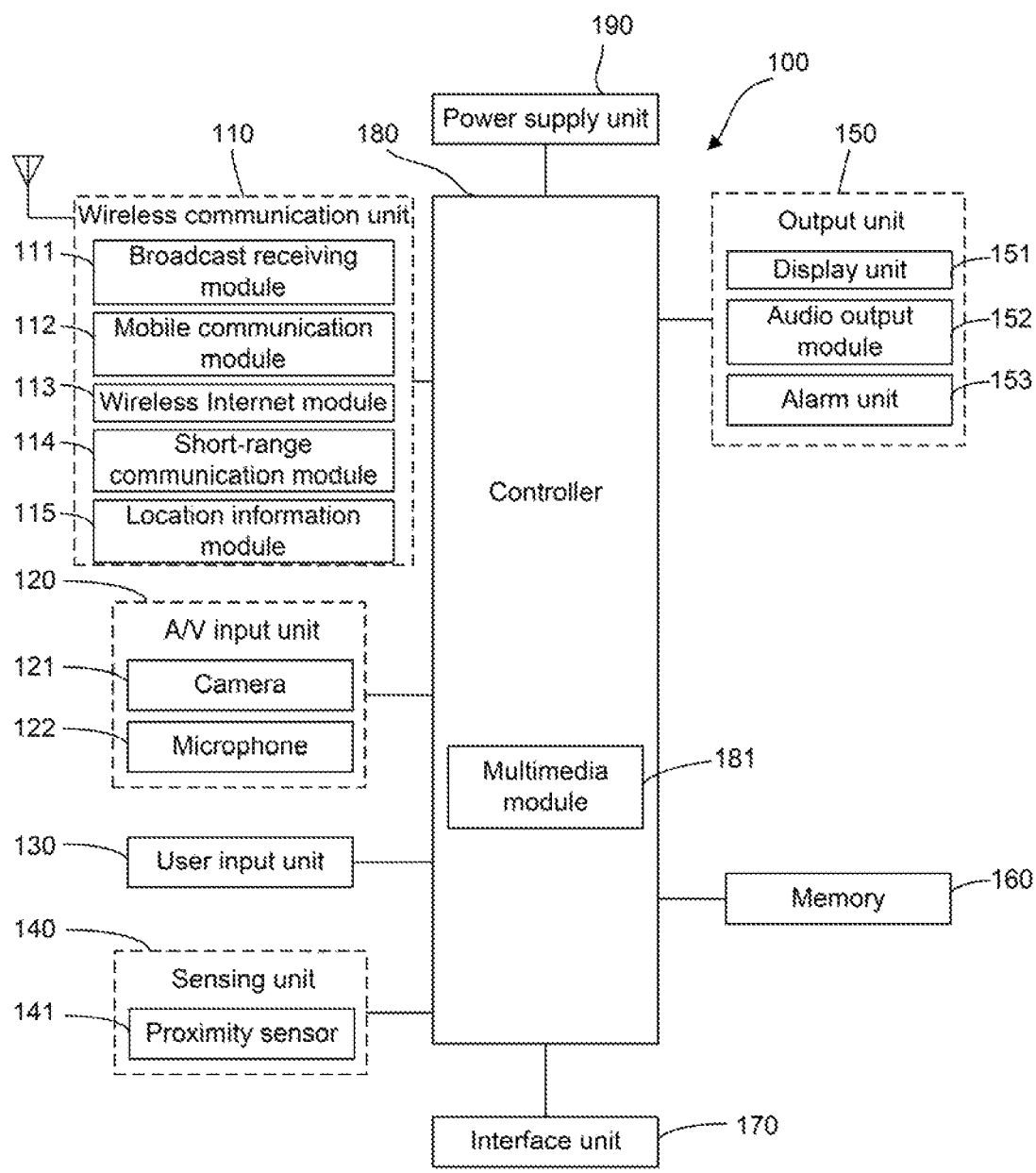
FIG. 1 is a hardware structure diagram of a mobile terminal according to various embodiments of the present disclosure.

The present disclosure will be further illustrated in detail hereinbelow in connection with the accompanying drawings and the embodiments. It should be understood that specific embodiments described herein are only intended to explain the present disclosure, and are not intended to limit the present disclosure.

While the performance of a mobile terminal such as a mobile phone is increasingly improved, electric power is consumed increasingly. Many devices in the mobile phone such as sensors like a Global Positioning System (GPS) chip, an optical sensor, a gravity sensor, a gyroscope, an acceleration sensor, a range sensor and so on, and functional modules like a Bluetooth module, a Wireless Local Area Network (WLAN) module, an infrared module, a Near Field Communication (NFC) module, a Temperature Probe (TP) and so on, are main power consumption devices. In each operation of the above-mentioned sensors and functional modules, data needs to be processed by a Central Processing Unit (CPU) in the mobile phone. If the CPU is kept in an on state for a long time, the endurance of the mobile phone will be sufficiently shortened.

Therefore, in order to save power, the sensors and the functional modules embed in the mobile terminal are kept in an off state. However, keeping the sensors and the functional modules in an off state brings the problem of limitation to an application scenario of the mobile terminal. For example, the mobile terminal cannot be used for navigation in a screen-off state, and an application cannot be awakened rapidly via a specific gesture in the screen-off state.

At present, the mobile phone adopts a co-processor based on a sensor hub technology, so the sensors and specific hardware of the mobile phone may be kept in an on state in a condition of low power consumption, and a correct response is made when necessary, so as to meet usage demands of the specific scenario. Therefore, in the embodiments of the present disclosure, when an Application Processor (AP) is switched to be in a sleep mode (that is, in a condition of low power consumption, the screen of the mobile terminal is turned off usually at this time since the mobile terminal is not used by the user), data output by the sensors is acquired by using the co-processor, it is judged whether the mobile terminal is stolen by using the data output by the sensors, and a sensor hub is an application of a Micro Control Unit (MCU). In system design, the co-processor has a main function of processing various pieces of information from various sensors. The AP is awakened from a sleep mode as necessary, thereby reducing the power consumption of the mobile terminal. The power consumption of a co-processor chip is only 1% to 2% of the AP. Thus, while monitoring whether the mobile terminal is stolen is realized, the endurance of the mobile terminal cannot be influenced.

The mobile terminal according to embodiments of the present disclosure will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PADs (Tablet Computer), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

FIG. 1 is a block diagram of a mobile terminal according to an embodiment of the present invention. As shown in FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190 and the like. FIG. 1 shows the mobile terminal as having various components, but it should be understood that implementing all of the illustrated components is not a requirement. More or fewer components may alternatively be implemented.

The wireless communication unit 110 typically includes one or more components allowing radio communication between the mobile terminal 100 and a wireless communication system or a network. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal. The broadcast associated information may also be provided via a mobile communication network and, in this instance, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like. The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique to which this module relates may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location information in real time.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151. The image frames processed by the camera 121 may be stored in the memory 160 (or other storage medium) or transmitted via the wireless communication unit 110. Two or more cameras 121 may be provided according to the configuration of the mobile terminal. The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 during the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted), a jog wheel, a jog switch, and the like. In particular, when the touch pad is overlaid on the display unit 151 in a layered manner, it may form a touch screen.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (110) ports, video I/O ports, earphone ports, or the like. The identification module may be a memory chip that stores various information for authenticating a user's authority for using the mobile terminal 100 and may include a user identity module (UIM), a subscriber identity module (SIM), a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may be operated as a signal for recognizing that the mobile terminal is accurately mounted on the cradle. The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

The audio output module 152 may convert, and output as sound, audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or the like.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152 by the alarm unit 153.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminal, without being limited to the slide-type mobile terminal.

The mobile terminal 100 as shown in FIG. 1 may be configured to operate with a communication system, which transmits data via frames or packets, such as wired and wireless communication systems, as well as satellite-based communication systems.

Such communication systems in which the mobile terminal according to an embodiment of the present invention can operate will now be described with reference to FIG. 2.

These communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 2:
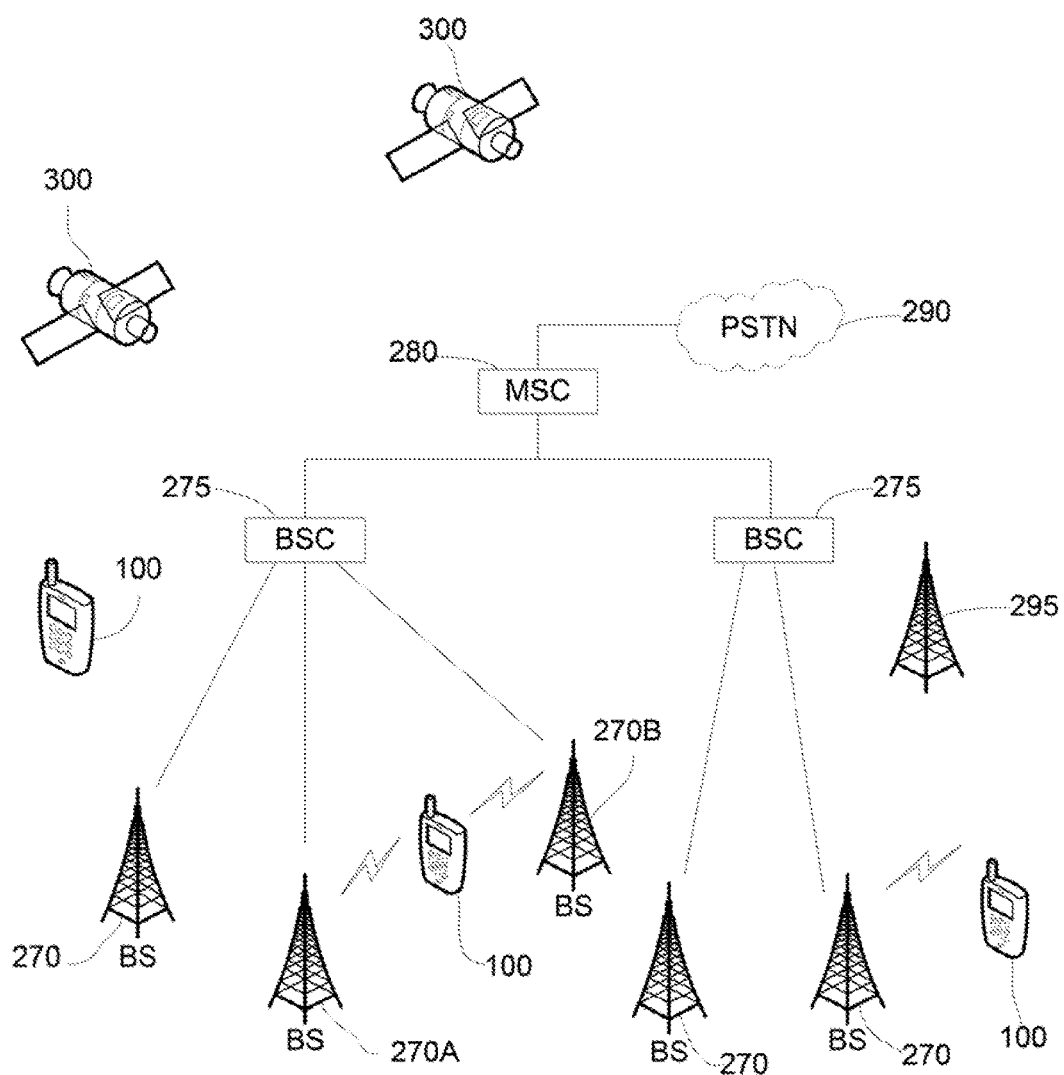
FIG. 2 is a schematic diagram of a wireless communication system of a mobile terminal as shown in FIG. 1.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In this situation, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 2, several global positioning systems (GPS) satellites 300 are shown. The satellites 300 help locate at least one of a plurality of terminals 100.

In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engage in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

The embodiments of the present disclosure are provided on the basis of the hardware structure of the above-mentioned mobile terminal and the communication system.

An interface display method provided in the embodiments of the present disclosure is mainly applied to a dual-card terminal (e.g., dual-card mobile phone). When the terminal is started or an action of swapping a SIM card is detected, a number of SIM card(s) in the terminal is detected, and then a display interface of the terminal is determined according to the number of the SIM card(s). Detailed description will be made hereinbelow with specific embodiments.

Figure 3:
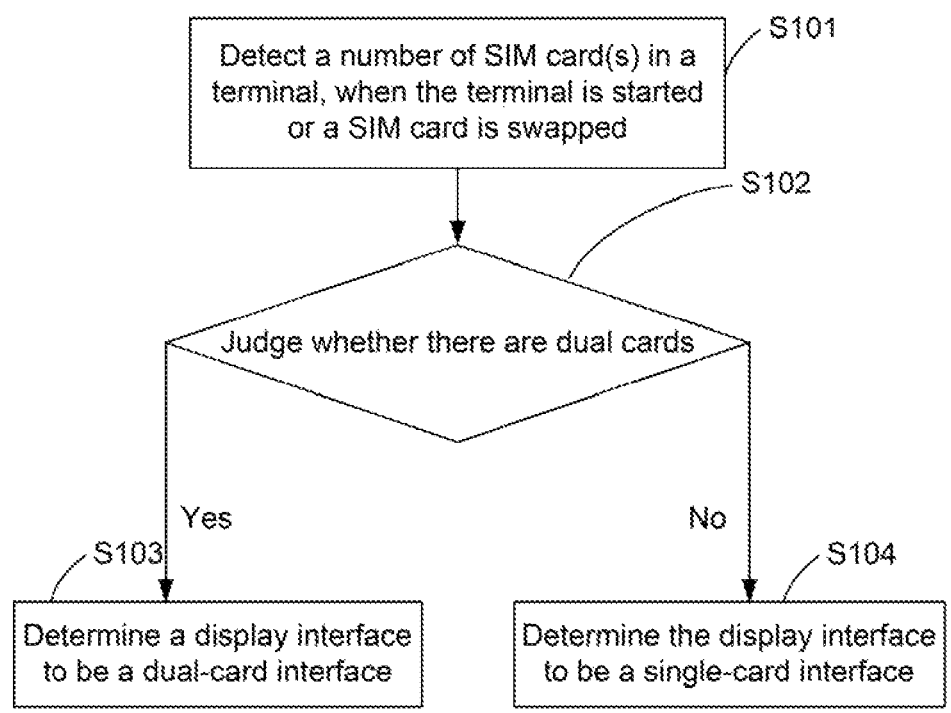
FIG. 3 is a flowchart of an interface display method according to a first embodiment of the present disclosure.

Referring to FIG. 3, an interface display method according to a first embodiment of the present disclosure is provided. The interface display method includes the following steps.

At Step S101: When a terminal is started or a SIM card is swapped, a number of SIM card(s) in the terminal is detected.

For example, when the terminal is started, the number of the SIM card(s) in the terminal is detected by a detection module. As for a terminal supporting hot-swap of the SIM cards, when a detection module detects that a SIM card is inserted or pulled out, SIM card information is actively detected, and the number of the SIM card(s) currently inserted into the terminal is acquired.

At Step S102: It is judged whether there are dual cards.

The terminal judges whether a card (single card) or two cards (dual cards) are inserted currently; if dual cards are inserted, it is determined that a terminal user is a dual-card user, and Step S103 is executed; and if a single card is inserted, it is determined that a terminal user is a single-card user, Step S104 is executed.

At Step S103: A display interface is determined to be a dual-card interface.

If dual cards are inserted into the terminal, the terminal user is a dual-card user, the display interface of the terminal is determined to be a dual-card interface, and the dual-card interface is invoked for display. In a specific implementation, the detection module of the terminal writes an identifier marked as the dual-card interface into a system attribute, and an interface is provided to acquire the identifier by an application layer. If a current display interface or a display interface before previous powering off is the dual-card interface, an interface display module of the terminal continuously keeps displaying the dual-card interface. If the current display interface or the display interface before previous powering off is the single-card interface, the interface display module of the terminal switches the single-card interface to the dual-card interface according to the identifier. In the present embodiment, the dual-card interface displays information about two cards simultaneously. For example, a dial displays dialing buttons of the two cards simultaneously, the two cards are marked as card 1 and card 2, and a prompt column displays signal intensity, call settings, phone books and the like of the two cards simultaneously, and displays relevant information of dual cards simultaneously.

At Step S104: The display interface is determined to be a single-card interface.

If a single card is inserted into the terminal, the terminal user is a single-card user, the display interface of the terminal is determined to be a single-card interface, and the single-card interface is invoked for display. In a specific implementation, the detection module of the terminal writes an identifier marked as the single-card interface into a system attribute, and an interface is provided to acquire the identifier by an application layer. If a current display interface or a display interface before previous powering off is the single-card interface, an interface display module of the terminal continuously keeps displaying the single-card interface. If the current display interface or the display interface before previous powering off is the double-card interface, the interface display module of the terminal switches the double-card interface to the single-card interface according to the identifier. In the present embodiment, the single-card interface only displays information about a card currently inserted, and does not display any information about a card which is not currently inserted. For example, a dial only displays dialing buttons of the card currently inserted, and does not display identifiers such as card 1 and card 2, and a prompt column only displays signal intensity, call settings, phone books and the like of the card currently inserted, and only displays relevant information of the card currently-inserted.

Thus, the number of SIM card(s) in the terminal is detected, and the single-card interface or the dual-card interface is dynamically displayed according to the number of the SIM card(s), thereby providing convenience in use for a user who uses a single card for a long time, while simplifying an operation flow when a dual-card user inserts a single card.

Figure 4:
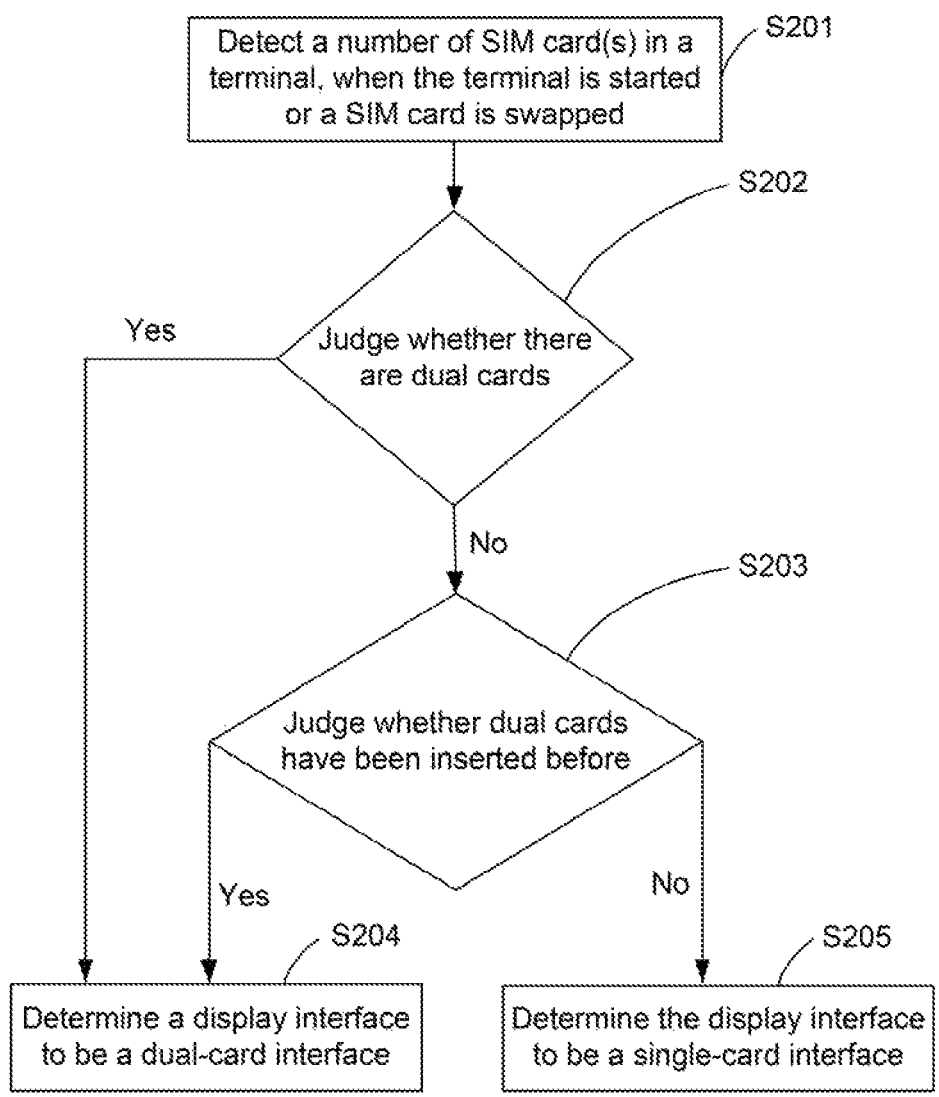
FIG. 4 is a flowchart of an interface display method according to a second embodiment of the present disclosure.

Referring to FIG. 4, an interface display method according to a second embodiment of the present disclosure is provided. The interface display method includes the following steps.

At Step S201: When a terminal is started or a SIM card is swapped, a number of SIM card(s) in the terminal is detected.

At Step S202: It is judged whether there are dual cards.

If dual cards are inserted, it is determined that a terminal user is a dual-card user, and Step S204 is executed; and if a single card is inserted, Step S203 is executed.

At Step S203: It is judged whether dual cards have been inserted before.

If a single card is inserted, it is continuously judged whether dual cards have been inserted into the terminal before, and if dual cards have been inserted before, a terminal user is determined to be a dual-card user, and Step S204 is executed; and if dual cards have not been inserted before, a terminal user is determined to be a single-card user, and Step S205 is executed. For example, it may be judged by reading a system attribute value of the terminal. If the system attribute value is marked as a dual-card interface, it is determined that dual cards have been inserted into the terminal before, and the system attribute value is not changed (or if time from the previous marking exceeds a preset value, the system attribute value may be changed). If the system attribute value is marked as a single-card interface or has never been marked, it is determined that dual cards have not been inserted into the terminal before.

Alternatively, an interface display history of the terminal may be inquired. If the dual-card interface has been displayed on the terminal, it is determined that dual cards have been inserted into the terminal before; and if the dual-card interface has never been displayed on the terminal, it is determined that dual cards have not been inserted into the terminal before.

At Step S204: The display interface is determined to be a dual-card interface.

If dual cards are inserted into the terminal or dual cards have been inserted before although a single card is inserted currently, it is determined that the terminal user is a dual-card user, the display interface is determined to be a dual-card interface, and the dual-card interface is invoked for display.

At Step S205: The display interface is determined to be a single-card interface.

If a single card is inserted into the terminal or dual cards have never been inserted before, it is determined that the terminal user is a single-card user, the display interface is determined to be a single-card interface, and the single-card interface is invoked for display.

Thus, insertion of SIM cards is dynamically monitored, and the single-card interface or the dual-card interface is dynamically displayed according to the number of the SIM card(s) inserted into the terminal currently and the situation of the SIM cards inserted previously. Even if a situation of transient card drop occurs when the user inserts dual cards, the dual-card interface will be displayed during the period of card drop, so the single-card interface can be always displayed for the single-card user, and the dual-card interface can be always displayed for the dual-card user.

Figure 5:
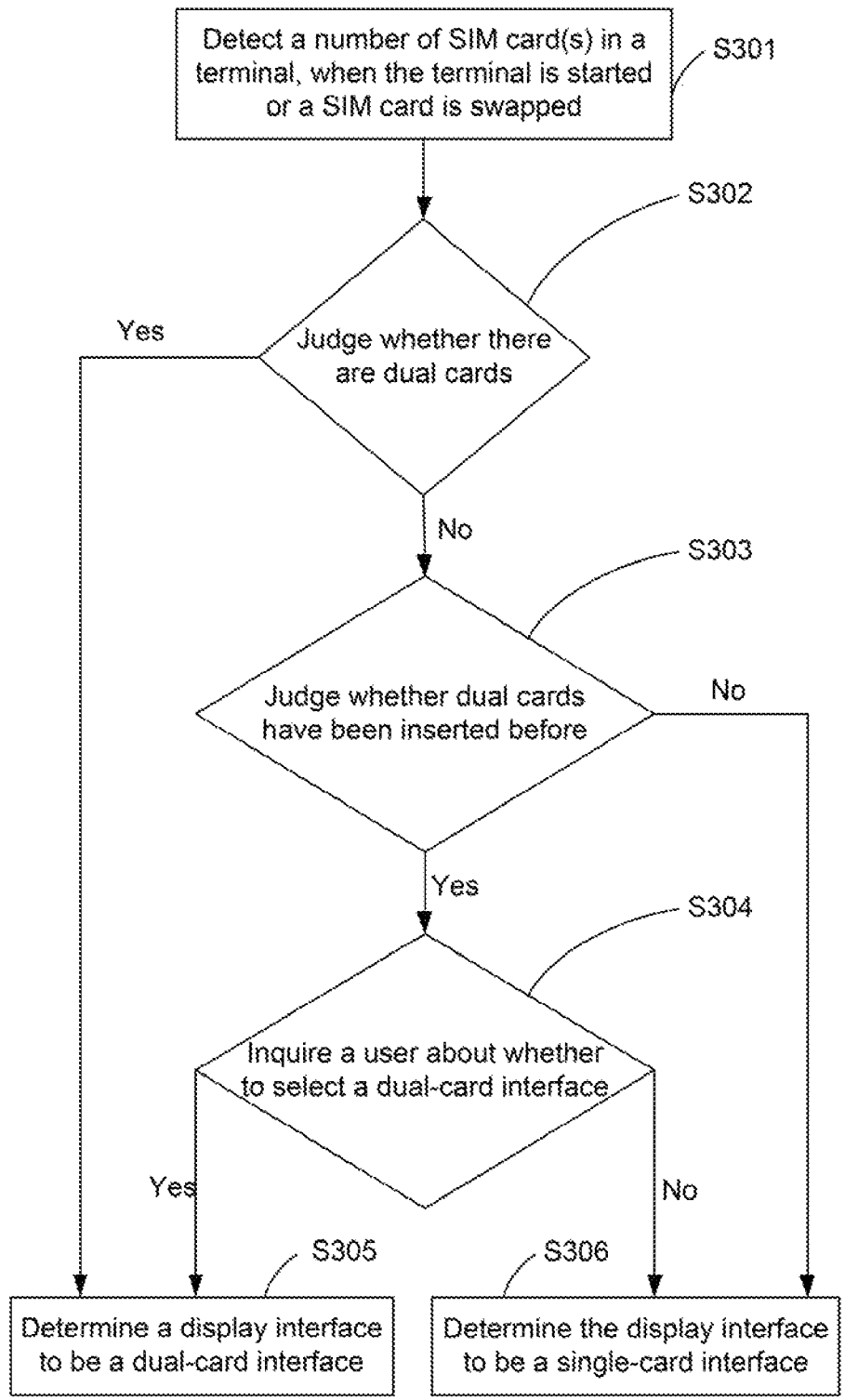
FIG. 5 is a flowchart of an interface display method according to a third embodiment of the present disclosure.

Referring to FIG. 5, an interface display method according to a third embodiment of the present disclosure is provided. The interface display method includes the following steps.

At Step S301: When a terminal is started or a SIM card is swapped, a number of SIM card(s) in the terminal is detected.

At Step S302: It is judged whether there are dual cards.

If dual cards are inserted, Step S305 is executed; and if a single card is inserted, Step S303 is executed.

At Step S303: It is judged whether dual cards have been inserted before.

If a single card is inserted, it is continuously judged whether dual cards have been inserted before. For example, it may be judged by reading a system attribute value of the terminal. If the system attribute value is marked as a dual-card, it is determined that dual cards have been inserted into the terminal before, the system attribute value is not changed, and Step S304 is executed. If the system attribute value is marked as a single-card or has never been marked, it is determined that dual cards have not been inserted into the terminal before, and Step S306 is executed.

Alternatively, an interface display history of the terminal may be inquired. If the dual-card interface has been displayed on the terminal, it is determined that dual cards have been inserted into the terminal before; and if the dual-card interface has never been displayed on the terminal, it is determined that dual cards have not been inserted into the terminal before.

At Step S304: A user is inquired about whether to select a dual-card interface.

For example, if dual cards have been inserted before although a single card is inserted currently, a dialog interface may pop up to inquire the user about whether to select a dual-card interface. If the user selects the dual-card interface, Step S305 is executed; and if the user selects a single-card interface, Step S306 is executed.

At Step S305: The display interface is determined to be the dual-card interface.

If dual cards are inserted into the terminal, or dual cards have been inserted before although a single card is inserted currently and the user selects the dual-card interface, the display interface is determined to be the dual-card interface, and the dual-card interface is invoked for display.

At Step S306: The display interface is determined to be a single-card interface.

If a single card is inserted into the terminal and dual cards have never been inserted before, or the user selects a single-card interface although dual cards have been inserted before, the display interface is determined to be the single-card interface, and the single-card interface is invoked for display.

Thus, when it is detected that the dual-card user uses a single card currently, the user may make a choice about a display interface. Due to provision of an independent choice right for the user, the user experience is improved.

The interface display method of the present disclosure may be configured for a multi-card terminal, and a single-card interface, a dual-card interface, a triple-card interface or the like is displayed according to the number of the SIM card(s).

Figure 6:
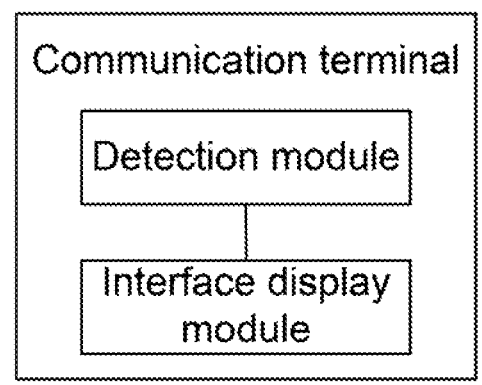
FIG. 6 is a block diagram of a communication terminal according to an embodiment of the present disclosure.

Referring to FIG. 6, a communication terminal according to an embodiment of the present disclosure is provided. The communication terminal includes a detection module and an interface display module.

The detection module is configured to detect number of SIM card(s) in a terminal via a processor, a microprocessor or a baseband module in a mobile terminal.

For example, when the terminal is started, the number of the SIM card(s) in the terminal is detected by the detection module. As for a terminal supporting hot-swap of the SIM cards, when a detection module detects that a SIM card is inserted or pulled out, SIM card information is actively detected, and the number of the SIM card(s) currently inserted into the terminal is acquired.

The interface display module is configured to determine a display interface according to the number of the SIM card(s) via a processor, a microprocessor, an Application Specific Integrated Circuit (ASIC) or a Field Programmable Gate Array (FPGA) in the mobile terminal.

Alternatively, if the SIM cards in the terminal are dual cards, the interface display module determines the display interface to be a dual-card interface, and invokes the dual-card interface for display. If the SIM card in the terminal is a single card, the interface display module determines the display interface to be a single-card interface, and invokes the single-card interface for display. In the present embodiment, the dual-card interface displays information about two cards simultaneously. For example, a dial displays dialing buttons of the two cards simultaneously, the two cards are marked as card 1 and card 2, and a prompt column displays signal intensity, call settings, phone books and the like of the two cards simultaneously, and displays relevant information of dual cards simultaneously. The single-card interface only displays information about a card currently inserted, and does not display any information about a card which is not currently inserted. For example, the dial only displays a dialing button of the card currently inserted, and does not display the identifiers such as card 1 and card 2, and a prompt column only displays signal intensity, call settings, phone books and the like of the card currently inserted, and only displays relevant information of the card currently inserted.

Alternatively, if the SIM cards in the terminal are dual cards, the interface display module determines the display interface to be a dual-card interface, and invokes the dual-card interface for display. If the SIM card in the terminal is a single card, the interface display module judges whether dual cards have been inserted into the terminal before; if dual cards have been inserted, the display interface is determined to be the dual-card interface; and if dual cards have not been inserted, the display interface is determined to be a single-card interface, and the single-card interface is invoked for display.

Alternatively, if the SIM cards in the terminal are dual cards, the interface display module determines the display interface to be a dual-card interface, and invokes the dual-card interface for display. If the SIM card in the terminal is a single card, the interface display module judges whether dual cards have been inserted into the terminal before; if dual cards have been inserted, a user is inquired about which display interface to be selected, and the display interface is determined according to the choice of the user; and if dual cards have not been inserted, the display interface is determined to be a single-card interface, and the single-card interface is invoked for display.

Alternatively, the detection module marks a system attribute according to the number of the SIM card(s) in the terminal. If dual cards are inserted currently, the detection module marks the system attribute as a dual-card interface; and if a single card is inserted currently, the detection module judges whether the currently marked system attribute value is a dual-card interface. If the system attribute value is marked as the dual-card interface, the system attribute value is not changed (or if time from the previous marking exceeds a preset value, the system attribute value may be changed), and otherwise, the system attribute value is marked as a single-card interface. Thus, when it is judged whether dual cards have been inserted before, the interface display module may read a system attribute value of the terminal. If the system attribute value is marked as a dual-card interface, it is determined that dual cards have been inserted into the terminal before. If the system attribute value is marked as a single-card interface or has never been marked, it is determined that dual cards have not been inserted into the terminal before. Alternatively, the interface display module may inquire an interface display history of the terminal. If the dual-card interface has been displayed on the terminal, it is determined that dual cards have been inserted into the terminal before; and if the dual-card interface has never been displayed on the terminal, it is determined that dual cards have not been inserted into the terminal before.

The technical features in the above-mentioned method embodiment are correspondingly applied to the present apparatus, which will not be elaborated herein.

Accordingly, the communication terminal of the present disclosure detects the number of SIM card(s), and dynamically displays the single-card interface or the dual-card interface according to the number of the SIM card(s), thereby providing convenience in use for a user who uses a single card for a long time, while simplifying an operation flow when a dual-card user inserts a single card.

Further, the single-card interface or the dual-card interface is dynamically displayed by combining the number of current SIM card(s) and the situation of the previously-inserted SIM cards. Even if a situation of transient card drop occurs when the user inserts dual cards, the dual-card interface will be displayed during the period of card drop, so the single-card interface can be always displayed for the single-card user, and the dual-card interface can be always displayed for the dual-card user. In addition, when it is detected that the dual-card user uses a single card currently, the user may make a choice about a display interface. Due to provision of an independent choice right for the user, the user experience is improved.

It is important to note that the communication terminal provided in the above-mentioned embodiments is illustrated when interface display is performed, taking division of the above-mentioned functional modules as only an example. In a practical application, functional allocation may be completed by different functional modules as required. In addition, the communication terminal provided in the above-mentioned embodiments and the embodiment for the interface display method belong to the same concept. Its specific implementation process is detailed in the method embodiment, which will not be elaborated herein.

The embodiments of the present disclosure also provide a computer storage medium. Executable instructions are stored in the computer storage medium. The executable instructions are for executing the interface display method as shown in any of FIGS. 3 to 5.

Those of ordinary skill in the art may understand that all or some steps implementing the above-mentioned method embodiment may be completed by instructing relevant hardware via a program, the program may be stored in a computer-readable storage medium, and when the program is executed, the steps in the above-mentioned method embodiment are executed; and the previously-mentioned storage medium includes: various media capable of storing program codes such as a mobile storage device, a Random Access Memory (RAM), a Read-Only Memory (ROM), a magnetic disk, an optical disc or the like.

Or, if an integrated unit mentioned above in the present disclosure is implemented in a form of a software function module and is sold or used as an independent product, the product may be stored in a computer-readable storage medium. Based on this understanding, the technical solutions of the embodiments of the disclosure may be essentially, or for parts contributing to the related art, embodied in a software product form, and a computer software product is stored in a storage medium, including a plurality of instructions enabling a computer device (which may be a personal computer, a server or a network device and so on) to execute all or some of the methods according to embodiments of the present disclosure. The previously-mentioned storage medium includes: various media capable of storing program codes, such as a mobile storage device, an RAM, an ROM, a magnetic disk, an optical disc or the like.

What are described above are only specific implementations of the present disclosure. However, the scope of protection of the present disclosure is not limited thereto. Those skilled in the art may easily conceive of variations or replacements within the disclosed technical scope of the present disclosure. These variations or replacements shall fall within the scope of protection of the present disclosure. Therefore, the scope of protection present disclosure shall be based on the scope of protection of the claims.

What is claimed is:

1. An interface display method performed by a mobile terminal comprising a processor and a display,
   the method comprising:
   detecting, by the processor, a number of Subscriber Identity Module (SIM) card(s) in the mobile terminal;
   determining, by the processor, a display interface of the mobile terminal according to the number of the SIM card(s), wherein the determining of the display interface includes:
   when the number of SIM card(s) detected is two corresponding to dual cards in the terminal, determining, by the processor, the display interface of the mobile terminal to be a dual-card interface,
   when the number of SIM card(s) detected is one corresponding to a single card in the mobile terminal, reading, by the processor, a system attribute value of the mobile terminal, the system attribute value representing an interface display history of the mobile terminal,
   when the system attribute value representing the interface display history is marked as the dual-card interface, determining, by the processor, the display interface of the mobile terminal to be the dual-card interface or inquiring, by the processor, a user about which display interface between a single-card interface and the dual-card interface to be selected and then determining the display interface of the mobile terminal according to the user's selection, and
   when the system attribute value representing the interface display history is marked as the single-card interface, determining, by the processor, the display interface of the mobile terminal to be the single-card interface; and
   displaying, by the display, the display interface determined by the processor.

2. The interface display method according to claim 1, wherein determining, by the processor, the display interface of the terminal according to the number of the SIM card(s) comprises:
   determining the display interface of the terminal to be a dual-card interface, when dual cards are detected in the terminal.

3. A mobile communication terminal, comprising:
   a processor;
   a display; and
   a memory for storing instructions executable by the processor, wherein: the processor is configured to:
   detect a number of Subscriber Identity Module (SIM) card(s) in the mobile terminal; and
   determine a display interface of the communication terminal according to the number of the SIM card(s), wherein the processor is further configured to:
   when the number of SIM card(s) detected is two corresponding to dual cards in the communication terminal, determining, by the processor, the display interface of the communication terminal to be a dual-card interface,
   when the number of SIM card(s) detected is one corresponding to a single card in the mobile terminal, read a system attribute value of the mobile terminal, the system attribute value representing an interface display history of the mobile terminal, when the system attribute value representing the interface display history is marked as the dual-card interface, determine the display interface of the mobile terminal to be the dual-card interface or inquire a user about which display interface between a single-card interface and the dual-card interface to be selected and then determine the display interface of the mobile terminal according to the user's selection, and when the system attribute value representing the interface display history is marked as the single-card interface, determine the display interface of the mobile terminal to be the single-card interface; and the display is configured to display the display interface determined by the processor.

4. The communication terminal according to claim 3, wherein the processor is further configured to:

determine the display interface to be a dual-card interface, when the SIM cards in the terminal are dual cards.

5. A non-transitory computer readable storage medium of a mobile terminal having stored therein executable instructions that when being executed, cause a processor of the mobile terminal to:

detect a number of Subscriber Identity Module (SIM) card(s) in the mobile terminal; and determine a display interface of the mobile terminal according to the number of the SIM card(s), by:

when the number of SIM card(s) detected is two corresponding to dual cards in the terminal, determining, by the processor, the display interface of the mobile terminal to be a dual-card interface, when the number of SIM card(s) detected is one corresponding to a single card in the mobile terminal, reading a system attribute value of the mobile terminal, the system attribute value representing an interface display history of the mobile terminal, when the system attribute value representing the interface display history is marked as the dual-card interface, determining the display interface of the mobile terminal to be the dual-card interface or inquiring a user about which display interface between a single-card interface and the dual-card interface to be selected and then determining the display interface of the mobile terminal according to the user's selection, and when the system attribute value representing the interface display history is marked as the single-card interface, determining the display interface of the mobile terminal to be the single-card interface; and cause a display of the mobile terminal to display the display interface determined by the processor.

6. The non-transitory computer readable storage medium according to claim 5, wherein the processor determines the display interface of the terminal according to the number of the SIM card(s), further includes:

determining the display interface of the terminal to be a dual-card interface, when dual cards are detected in the terminal.

* * * * *